(12) United States Patent
    Xu

(10) Patent No.: US 10,214,424 B2
(45) Date of Patent: *Feb. 26, 2019

(54) NANOPOROUS GRAPHENE NANOWIRES AND PRODUCING METHODS AND APPLICATIONS OF SAME

(71) Applicant: HK GRAPHENE TECHNOLOGY CORPORATION, Pasadena, CA (US)

(72) Inventor: Jianguo Xu, Pasadena, CA (US)

(73) Assignee: HK GRAPHENE TECHNOLOGY CORPORATION, Pasadena, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/710,997

(22) Filed: Sep. 21, 2017

(65) Prior Publication Data

US 2018/0009668 A1    Jan. 11, 2018

Related U.S. Application Data

(63) Continuation of application No. 14/640,800, filed on Mar. 6, 2015, now Pat. No. 9,796,592.

(51) Int. Cl.
| | |
|---|---|
| *H01M 4/00* | (2006.01) |
| *C01B 32/184* | (2017.01) |
| *H01M 4/583* | (2010.01) |
| *C01B 32/186* | (2017.01) |
| *H01M 4/587* | (2010.01) |
| *H01M 10/05* | (2010.01) |

(52) U.S. Cl.
CPC .......... *C01B 32/184* (2017.08); *C01B 32/186* (2017.08); *H01M 4/583* (2013.01); *C01B 2204/32* (2013.01); *C01P 2004/16* (2013.01); *C01P 2006/12* (2013.01); *H01M 4/587* (2013.01); *H01M 10/05* (2013.01)

(58) Field of Classification Search
CPC ... H01M 10/05; H01M 4/587; C01P 2006/12; C01B 2204/32; C01B 32/186
See application file for complete search history.

(56) References Cited

U.S. PATENT DOCUMENTS

2015/0364227 A1* 12/2015 Tai ........................ H01B 1/08
                                                        428/221

* cited by examiner

*Primary Examiner* — Cynthia H Kelly
*Assistant Examiner* — Monique M Wills
(74) *Attorney, Agent, or Firm* — Locke Lord LLP; Tim Tingkang Xia, Esq.

(57) ABSTRACT

A material of porous graphene nanowires with a pore-rich structure is formed by synthesis of catalyst nanowires for porous graphene nanowires, chemical vapor deposition of a carbon source on the catalysts to grow graphene, removal of residual catalyst, and formation of the porous graphene nanowires. The porous graphene nanowires can be used as an electrochemical energy storage material, carriers of catalysts, a conductive material, an adsorption material, a desorption material, or the like.

18 Claims, 5 Drawing Sheets

NANOPOROUS GRAPHENE NANOWIRES AND PRODUCING METHODS AND APPLICATIONS OF SAME

CROSS-REFERENCE TO RELATED PATENT APPLICATION

This application is a continuation application of, and claims the benefit of U.S. patent application Ser. No. 14/640,800, filed Mar. 6, 2015, now allowed, which is incorporated herein in its entirety by reference.

FIELD OF THE INVENTION

The invention relates generally to nanocarbon materials, and more particularly to a porous graphene nanowire material with a pore-rich structure, production methods and applications of the porous graphene nanowire material.

BACKGROUND OF THE INVENTION

The background description provided herein is for the purpose of generally presenting the context of the present invention. The subject matter discussed in the background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions. Work of the presently named inventors, to the extent it is described in the background of the invention section, as well as aspects of the description that may not otherwise qualify as prior art at the time of filing, are neither expressly nor impliedly admitted as prior art against the present invention.

Nanocarbon materials have widespread applications, especially in the field of electrochemical energy storages, catalyst preparations, transparent conductive films, conductive materials, reinforced materials, adsorption and desorption materials, and so on. Among them, $sp^2$ hybridization based nanocarbon materials have excellent mechanical flexibility and conductivity. For example, the $sp^2$ hybridization based carbon atoms can form two-dimensional (2-D) graphene, which has a large specific surface area, as well as excellent conductive and mechanical properties. The 2-D graphene crimps together, thereby forming carbon nanotubes with 1-D tubular structure. These carbon nanotubes have high length-to-diameter ratio and excellent conductivity and mechanical strength. Meanwhile, the $sp^2$ hybridization based carbon atoms can also form 0-D graphene ball ($C_{60}$), which has peculiar electronic effects. Clearly, the $sp^2$ hybridization based nanocarbon materials have excellent physical and chemical properties, as well as important applications.

So far, graphene ball, carbon nanotubes, and graphene rods that are based on $sp^2$ hybridization have been prepared and exhibit excellent properties and widespread applications. However, further preparation of 3-D nanocarbon materials that are based on $sp^2$ hybridization has been limited. There are references reporting that $sp^2$ hybridization based graphene can be used to prepare porous graphene fiber. For example, Chinese Patent No. CN 102586946 discloses porous ordered high strength graphene fibers and its applications. The dispersed graphene is spun into porous graphene fibers. However, the preparation process is controlled by the dispersion and combination of graphene units, which leads to the limited integrity and continuity of the prepared porous graphene fibers. Chinese Patent No. CN 103588196 discloses hierarchical porous graphene fibers as well as its preparations and applications. Inorganic fibers are used as template, and most of graphene is grown on the surface of the inorganic fibers, which cannot form a homogeneous porous fiber structure.

Therefore, a heretofore unaddressed need exists in the art to further explore and improve 3-D nanocarbon materials so as to prepare homogeneous porous nanocarbon fibers that are based on $sp^2$ hybridization and explore its applications.

SUMMARY OF THE INVENTION

In order to address the aforementioned deficiencies and inadequacies, one of the objectives of this invention is provide a material of porous graphene nanowires with a pore-rich structure. Further, the porous graphene nanowires possess a continuous carbon nanowire structure. The invention also provides production methods and applications of the porous graphene nanowires.

In one aspect of the invention, the method for producing the nanoporous graphene nanowires comprises the steps of dissolving a magnesium compound into water to form a solution having a concentration of magnesium ions in a range of about 0.005-10.0 mol/L, and treating the solution under hydrothermal synthesis to obtain catalysts; calcining the catalysts at a temperature in a range of about 100-800° C. to form porous catalyst nanowires; introducing a carbon source to a reactor containing the porous catalyst nanowires at a temperature in a range of about 400-1500° C. to grow graphene on the porous catalyst nanowires, thereby forming a composite thereof; and obtaining porous graphene nanowires from the formed composite.

In one embodiment, the porous graphene nanowires have fiber morphology, with lengths in a range of about 0.5 μm to about 2 mm, and diameters in a range of about 10 nm to about 15 μm.

In one embodiment, the porous graphene nanowires have a pore-rich structure, with a specific surface area in a range of about 1000-3000 m²/g.

In one embodiment, the catalysts have nanowire morphology, with lengths in a range of about 0.5 μm to about 2 mm and diameters in a range of about 10 nm to about 15 μm.

In one embodiment, the magnesium compound comprises magnesium oxide, magnesium hydroxide, magnesium chloride, magnesium nitrate, magnesium sulfate, magnesium acetate, magnesium carbonate, or any combination thereof.

In one embodiment, the carbon source comprises hydrocarbon, or a heteroatom-containing organic compound.

In one embodiment, the hydrocarbon comprises aromatic hydrocarbon, or non-aromatic hydrocarbon. In one embodiment, the aromatic hydrocarbon comprises benzene, toluene (also known as toluol), xylene (also known as xylol or dimethylbenzene), or any combination thereof. In one embodiment, the non-aromatic hydrocarbon comprises methane, ethane, propane, ethylene, propylene, acetylene, or any combination thereof.

In one embodiment, the heteroatom-containing organic compound comprises sucrose, glucose, polyimide, polyaniline, phenolic resin, thiophene, or any combination thereof.

In one embodiment, the step of treating the solution under the hydrothermal synthesis comprises the step of heating the solution at a temperature in a range of about 100-300° C. for a period of time in a range of about 1-20 hours.

In one embodiment, the step of introducing the carbon source is performed with chemical vapor deposition, wherein a reaction time for the chemical vapor deposition is in a range of about 30 seconds to about 15 hours.

In one embodiment, the step of obtaining the porous graphene nanowires comprises the steps of dissolving the formed composite into an acid reagent; and removing the porous catalyst nanowires from the dissolved composite to obtain the porous graphene nanowires. In one embodiment, the acid reagent comprises hydrochloric acid, acetic acid, nitric acid, or sulfuric acid.

In another aspect, the invention relates to a material of porous graphene nanowires produced according to the above-disclosed method.

In yet another aspect, the invention relates to an article comprising the material of porous graphene nanowires as disclosed above.

In one embodiment, the material of porous graphene nanowires is adapted as an electrochemical energy storage material, carriers of catalysts, a conductive material, an adsorption material, a desorption material, or the like.

In one embodiment, the article is an electrode usable for a battery.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and together with the written description, serve to explain the principles of the invention. Wherever possible, the same reference numbers are used throughout the drawings to refer to the same or like elements of an embodiment.

DETAILED DESCRIPTION OF THE INVENTION

Figure 1:
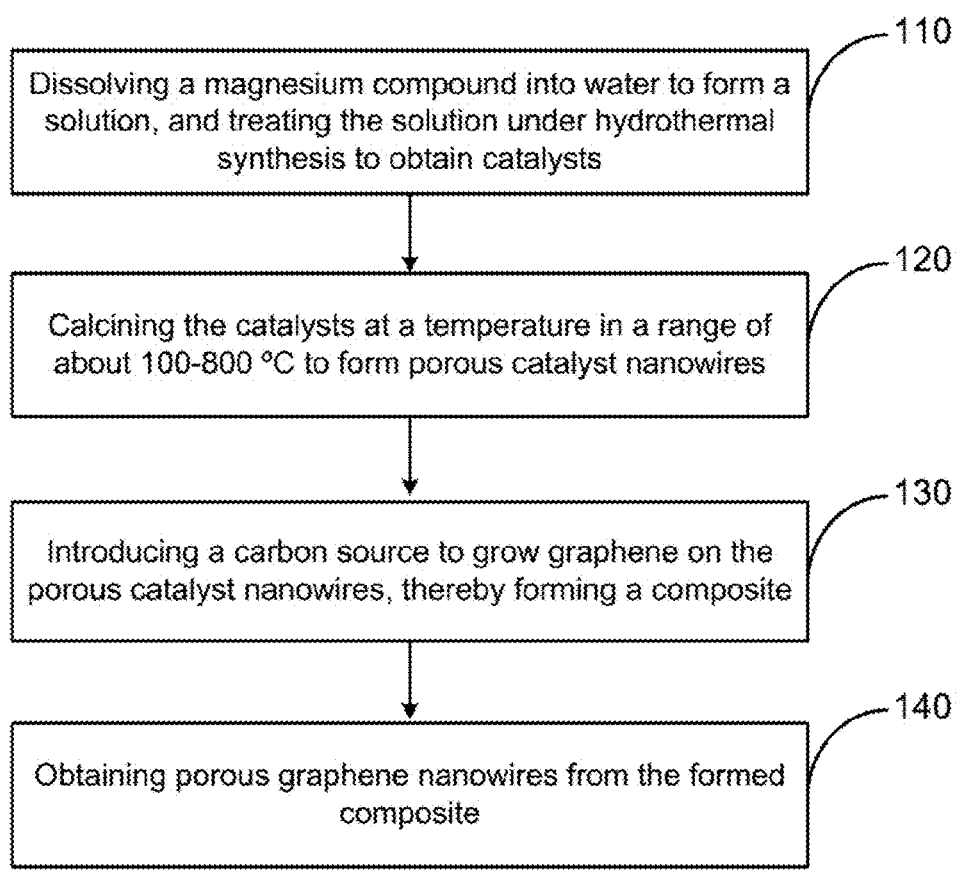
FIG. 1 shows schematically a flowchart for a method of producing porous graphene nanowires according to one embodiment of the present invention.

The invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term are the same, in the same context, whether or not it is highlighted. It will be appreciated that the same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", or "includes" and/or "including" or "has" and/or "having" when used in this specification specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top", may be used herein to describe one element's relationship to another element as illustrated in the figures. It will be understood that relative terms are intended to encompass different orientations of the device in addition to the orientation depicted in the figures. For example, if the device in one of the figures is turned over, elements described as being on the "lower" side of other elements would then be oriented on "upper" sides of the other elements. The exemplary term "lower" can, therefore, encompass both an orientation of "lower" and "upper", depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about", "substantially" or "approximately" shall generally mean within 20 percent, preferably within 10 percent, and more preferably within 5 percent of a given value or range. Numerical quantities given herein are approximate, meaning that the term "around", "about", "substantially" or "approximately" can be inferred if not expressly stated.

As used herein, the terms "comprise" or "comprising", "include" or "including", "carry" or "carrying", "has/have" or "having", "contain" or "containing", "involve" or "involving" and the like are to be understood to be open-ended, i.e., to mean including but not limited to.

As used herein, the phrase "at least one of A, B, and C" should be construed to mean a logical (A or B or C), using a non-exclusive logical OR. It should be understood that one or more steps within a method may be executed in different order (or concurrently) without altering the principles of the invention.

As used herein, the term "nanowire" refers to an object having two dimensions on the nanoscale, i.e., the diameter of the nanowire is between 1.0 and 1000.0 nm and its length could be much greater, and may be exchangeable with the terms "nanowire". "nanofiber", " nanotree", " nanotube" and "nanorod".

The description is now made as to the embodiments of the invention in conjunction with the accompanying drawings. In accordance with the purposes of this invention, as embodied and broadly described herein, this invention relates to a porous graphene nanowire material with a pore-rich structure, production methods and applications of the porous graphene nanowire material.

Referring to FIG. 1, a flowchart for a method of producing the nanoporous graphene nanowires is shown according to one embodiment of the invention. In this exemplary embodiment, the method includes the following steps.

As step 110, a magnesium compound is dissolved into water to form a solution having a concentration of magnesium ions in a range of about 0.005-10.0 mol/L, and then the solution is treated under hydrothermal synthesis to obtain catalysts.

In certain embodiments, the magnesium compound comprises magnesium oxide, magnesium hydroxide, magnesium chloride, magnesium nitrate, magnesium sulfate, magnesium acetate, magnesium carbonate, or any combination thereof.

In certain embodiments, the treatment of the solution under the hydrothermal synthesis comprises heating the solution at a temperature in a range of about 100-300° C. for a period of time in a range of about 1-20 hours.

In certain embodiments, the catalyst can be characterized with nanowire morphology, with lengths in a range of about 0.5 μm to about 2 mm and diameters in a range of about 10 nm to about 15 μm.

At step 120, the catalyst is calcined at a temperature in a range of about 100-800° C. to form porous catalyst nanowires.

At step 130, a carbon source is introduced to a reactor containing the porous catalyst nanowires at a temperature in a range of about 400-1500° C. to grow graphene on the porous catalyst nanowires, thereby forming a composite thereof.

In certain embodiments, the carbon source can be hydrocarbon, or a heteroatom-containing organic compound.

In certain embodiments, the hydrocarbon includes aromatic hydrocarbon, or non-aromatic hydrocarbon. In certain embodiments, the aromatic hydrocarbon includes benzene, toluene (also known as toluol), xylene (also known as xylol or dimethylbenzene), or any combination thereof. In certain embodiments, the non-aromatic hydrocarbon comprises methane, ethane, propane, ethylene, propylene, acetylene, or any combination thereof.

In certain embodiments, the heteroatom-containing organic compound comprises sucrose, glucose, polyimide, polyaniline, phenolic resin, thiophene, or any combination thereof.

In certain embodiments, introduction of the carbon source into the reactor is performed with chemical vapor deposition. The reaction time for the chemical vapor deposition is in a range of about 30 seconds to about 15 hours.

At step 140, the porous graphene nanowires are obtained from the formed composite.

In certain embodiments, step 140 of obtaining the porous graphene nanowires includes the steps of dissolving the formed composite into an acid reagent; and removing the porous catalyst nanowires from the dissolved composite to obtain the porous graphene nanowires. In certain embodiments, the acid reagent comprises hydrochloric acid, acetic acid, nitric acid, or sulfuric acid.

It should be appreciated to one skilled in the art that other types of magnesium compounds, carbon sources and acid reagents may also be utilized to practice the invention.

In another aspect, the invention relates to a material of porous graphene nanowires produced according to the above-disclosed method. As such, the produced porous graphene nanowires have fiber morphology, with lengths in a range of about 0.5 μm to about 2 mm, and diameters in a range of about 10 nm to about 15 μm. Further, the porous graphene nanowires have a pore-rich structure, with a specific surface area in a range of about 1000-3000 $m^2/g$.

In yet another aspect, the invention relates to an article comprising the material of porous graphene nanowires as disclosed above.

In certain embodiments, the material of porous graphene nanowires is adapted as an electrochemical energy storage material, carriers of catalysts, a conductive material, an adsorption material, a desorption material, or the like.

In certain embodiments, the article is an electrode usable for a battery.

According to the invention, the method of producing the nanoporous graphene nanowires is simple and easy to operate, which is easy to realize industrial production. In addition, the basic units of the porous graphene nanowires prepared according to the method of this invention include curved layer graphene structure. The connection between different units is a direct interface connection, which forms the continuous nanocarbon materials. Furthermore, the nanocarbon materials possess porous structure, and can provide the large specific surface area.

Without intent to limit the scope of the invention, examples and their related results according to the embodiments of the present invention are given below.

EXAMPLE 1

Figure 2:
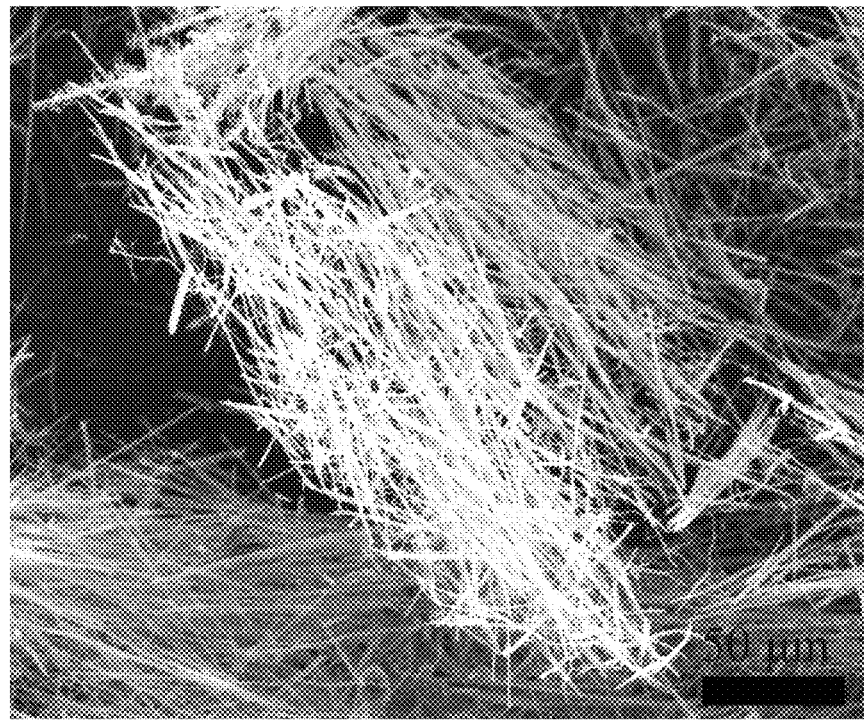
FIG. 2 shows a scanning electron microscope (SEM) image (morphology) of catalysts used to prepare porous graphene nanowires according to one embodiment of the present invention.

This exemplary example provides a method of producing porous graphene nanowires, the schematic illustration of the producing process is shown in FIG. 1. The method in this embodiment includes the following steps:

(1) Magnesium acetate is dissolved into water, with concentration of magnesium ions of about 1.0 mol/L. Then, the solution is put into a reaction still under about 180° C. for about 2 hours to obtain nanowire catalysts. FIG. 2 shows that the catalysts have nanowire morphology.

(2) The nanowire catalysts are calcined under the temperature of about 500° C., to form porous catalyst nanowires.

(3) Methane is introduced to a reactor containing the porous catalyst nanowires, using the chemical vapor deposition, at the temperature of about 900° C. for about 1 minute, which leads to the growth of graphene in the nanowire porous catalysts to form a composite therewith. The composite includes the grown graphene on the porous catalyst nanowires.

Figure 3:
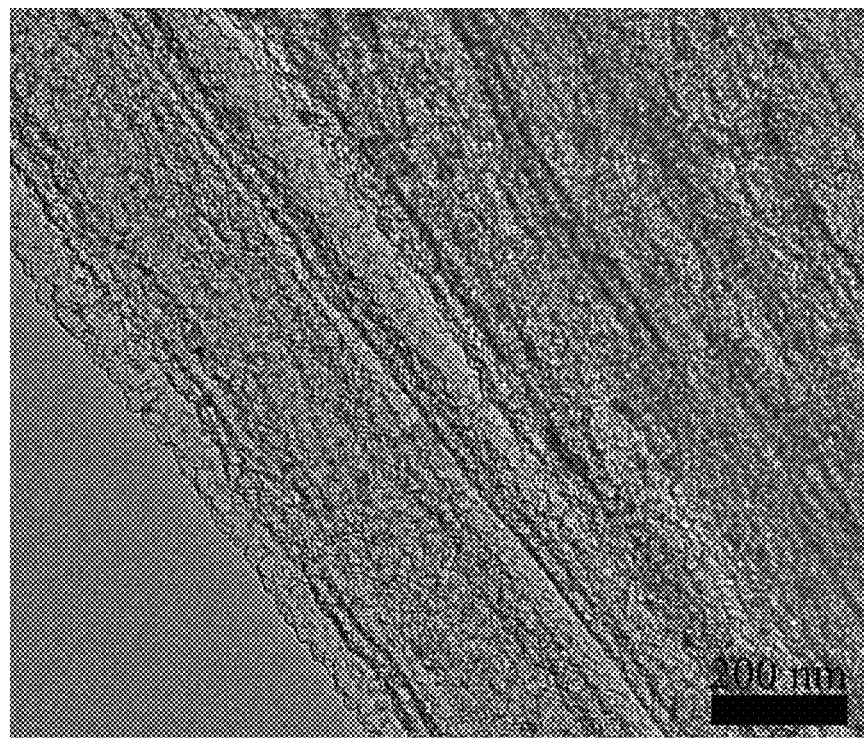
FIG. 3 shows an SEM image (morphology) of the porous graphene nanowires according to one embodiment of the present invention.

(4) The composite is dissolved into hydrochloric acid, and then the catalysts are removed to obtain the porous graphene nanowires. The TEM image of the obtained porous graphene nanowires is shown in FIG. 3, where the diameter of the porous graphene nanowires is about 600 nm, and the pore size is several nanometers.

Figure 4:
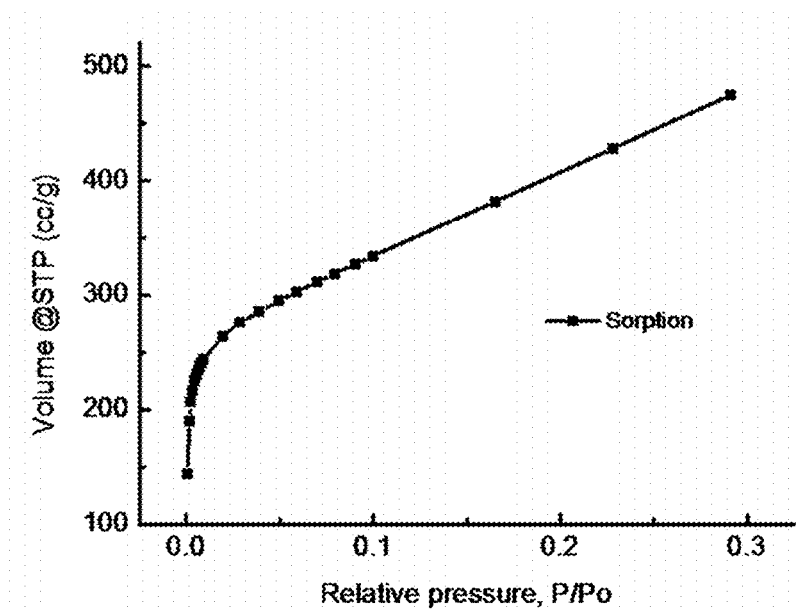
FIG. 4 shows the nitrogen adsorption curve of the porous graphene nanowires according to one embodiment of the present invention.

The specific surface area test shows that these pore structure of the porous graphene nanowires has very large adsorption ability. As shown in FIG. 4, the specific surface area of up to about 2184 $m^2/g$.

EXAMPLE 2

This example provides a method of producing porous graphene nanowires, which includes the following steps:

(1) Magnesium hydroxide is dissolved into water, with concentration of magnesium ions of about 0.01 mol/L. Then, the solution is put into a reaction still under about 200° C. for about 2 hours to obtain nanowire catalysts.

(2) The nanowire catalysts are calcined under the temperature of about 500° C., to form porous catalyst nanowires.

(3) Ethane is introduced to a reactor containing the porous catalyst nanowires, using the chemical vapor deposition, at the temperature of about 900° C. for about 1 hour, which leads to the growth of graphene in the porous nanowire catalysts to form a composite therewith. The composite includes the grown graphene on the porous catalyst nanowires.

(4) The composite is dissolved into nitric acid to remove the catalyst, thereby obtaining the porous graphene nanowires.

In this example, the obtained porous graphene nanowires have the diameter of about 200 nm, the length of about 500 μm and the specific surface area of up to about 500 $m^2/g$.

EXAMPLE 3

This example provides a method of producing porous graphene nanowires, which includes the following steps:

(1) Magnesium chloride is dissolved into water, with concentration of magnesium ions of about 0.1 mol/L. Then, the solution is put into a reaction still under about 180° C. for about 2 hours to obtain nanowire catalysts.

(2) The nanowire catalysts are calcined under the temperature of about 550° C., forming porous catalyst nanowires.

(3) Ethylene is introduced to a reactor containing the porous catalyst nanowires, using the chemical vapor deposition, at the temperature of about 800° C. for about 10 hours, which leads to the growth of graphene in the nanowire porous catalysts to form a composite therewith. The composite includes the grown graphene on the porous catalyst nanowires.

(4) The composite is dissolved into sulfuric acid and then the catalyst is removed to obtain the porous graphene nanowires.

In this example, the porous graphene nanowires have the diameter of about 1 μm, the length of about 600 μm and the specific surface area of up to about 360 $m^2/g$.

EXAMPLE 4

This example provides a method of producing porous graphene nanowires, which includes the following steps:

(1) Magnesium sulfate is dissolved into water, with concentration of magnesium ions of about 0.15 mol/L. Then, the solution is put into a reaction still under about 150° C. for 12 hours to obtain nanowire catalysts.

(2) The nanowire catalysts are calcined under the temperature of about 600° C., forming porous catalyst nanowires.

(3) Acetylene is introduced to a reactor containing the porous catalyst nanowires, using the chemical vapor deposition, at the temperature of about 600° C. for about 10 hours, which leads to the growth of graphene in the nanowire porous catalysts to form a composite therewith. The composite includes the grown graphene on the porous catalyst nanowires.

(4) The composite is dissolved into nitric acid and then the catalyst is removed to obtain the porous graphene nanowires.

In this example, the obtained porous graphene nanowires have the diameter of about 10 μm, the length of about 200 μm, and the specific surface area of up to about 300 $m^2/g$.

EXAMPLE 5

This example provides a method of producing porous graphene nanowires, which includes the following steps:

(1) Magnesium oxide is dissolved into water, with concentration of magnesium ions of about 0.01 mol/L. Then, the solution is put into a reaction still under about 200° C. for about 5 hours to obtain nanowire catalysts.

(2) The nanowire catalysts are calcined under the temperature of about 500° C., forming porous catalyst nanowires.

(3) Methane is introduced to a reactor containing the porous catalyst nanowires, using the chemical vapor deposition, at the temperature of about 1000° C. for about 0.5 hours, which leads to the growth of graphene in the nanowire porous catalysts to form a composite therewith. The composite includes the grown graphene on the porous catalyst nanowires.

(4) The composite is dissolved into hydrochloric acid and then the catalyst is removed to obtain the porous graphene nanowires.

In this example, the obtained porous graphene nanowires have the diameter of about 2 μm, the length of about 1 mm and the specific surface area of up to about 640 m²/g.

EXAMPLE 6

This example provides a method of producing porous graphene nanowires, which includes the following steps:

(1) Magnesium carbonate is dissolved into water, with concentration of magnesium ions of about 0.1 mol/L. Then, the solution is put into a reaction still under about 200° C. for about 5 hours to obtain nanowire catalysts.

(2) The nanowire catalysts are calcined under the temperature of about 600° C., forming porous catalyst nanowires.

(3) Propylene is introduced to a reactor containing the porous catalyst nanowires, using the chemical vapor deposition, at the temperature of about 800° C. for about 0.5 hours, which leads to the growth of graphene in the nanowire porous catalysts to form a composite therewith. The composite includes the grown graphene on the porous catalyst nanowires.

(4) The composite is dissolved into acetic acid and then the catalyst is removed to obtain the porous graphene nanowires.

In this example, the obtained porous graphene nanowires have the diameter of about 1 μm, the length of about 1 mm and the specific surface area of up to about 600 m²/g.

EXAMPLE 7

This example provides a method of producing porous graphene nanowires, which includes the following steps:

(1) Magnesium chloride is dissolved into water, with concentration of magnesium ions of 5 mol/L. Then, the solution is put into a reaction still under about 180° C. for about 2 hours to obtain nanowire catalysts.

(2) The nanowire catalysts are calcined under the temperature of about 550° C., forming porous catalyst nanowires.

(3) Benzene is introduced to a reactor containing the porous catalyst nanowires, using the chemical vapor deposition, at the temperature of about 600° C. for about 10 hours, which leads to the growth of graphene in the nanowire porous catalysts to form a composite therewith. The composite includes the grown graphene on the porous catalyst nanowires.

(4) The composite is dissolved into hydrochloric acid and then the catalyst is removed to obtain the porous graphene nanowires.

In this example, the obtained porous graphene nanowires have the diameter of about 200 nm, the length of about 100 μm and the specific surface area of up to about 320 m²/g.

EXAMPLE 8

This example provides a method of producing porous graphene nanowires, which includes the following steps:

(1) Magnesium nitrate is dissolved into water, with concentration of magnesium ions of 5 mol/L. Then, the solution is put into a reaction still under about 200° C. for about 2 hours to obtain nanowire catalysts.

(2) The nanowire catalysts are calcined under the temperature of about 500° C., forming porous catalyst nanowires.

(3) Methylbenzene is introduced to a reactor containing the porous catalyst nanowires, using the chemical vapor deposition, at the temperature of about 750° C. for about 0.5 hours, which leads to the growth of graphene in the nanowire porous catalysts to form a composite therewith. The composite includes the grown graphene on the porous catalyst nanowires.

(4) The composite is dissolved into hydrochloric acid and then the catalyst is removed to obtain the porous graphene nanowires.

In this example, the obtained porous graphene nanowires have the diameter of about 500 nm, the length of about 600 μm and the specific surface area of up to about 500 m²/g.

EXAMPLE 9

This example provides a method of producing porous graphene nanowires, which includes the following steps:

(1) Magnesium chloride is dissolved into water, with concentration of magnesium ions of about 0.9 mol/L. Then, the solution is put into a reaction still under about 180° C. for about 2 hours to obtain nanowire catalysts.

(2) The nanowire catalysts are calcined under the temperature of about 400° C., forming porous catalyst nanowires.

(3) Methylbenzene is introduced to a reactor containing the porous catalyst nanowires, using the chemical vapor deposition, at the temperature of about 800° C. for 1 min, which leads to the growth of graphene in the nanowire porous catalysts to form a composite therewith. The composite includes the grown graphene on the porous catalyst nanowires.

(4) The composite is dissolved into hydrochloric acid and then the catalyst is removed to obtain the porous graphene nanowires.

In this example, the obtained porous graphene nanowires have the diameter of about 200 nm, the length of about 600 μm and the specific surface area of up to about 2500 m²/g.

EXAMPLE 10

This example provides a method of producing porous graphene nanowires, which includes the following steps:

(1) Magnesium oxalate is dissolved into water, with concentration of magnesium ions of about 2.0 mol/L. Then, the solution is put into a reaction still under about 150° C. for about 5 hours to obtain nanowire catalysts.

(2) The nanowire catalysts are calcined under the temperature of 400° C., forming porous catalyst nanowires.

(3) The mixture of sucrose and glucose solution (weight ratio 1:1) is introduced to a reactor containing the porous catalyst nanowires, using the chemical vapor deposition, at the temperature of about 1000° C. for about 0.5 hours, which leads to the growth of graphene in the nanowire porous catalysts to form a composite therewith. The composite includes the grown graphene on the porous catalyst nanowires.

Figure 5:
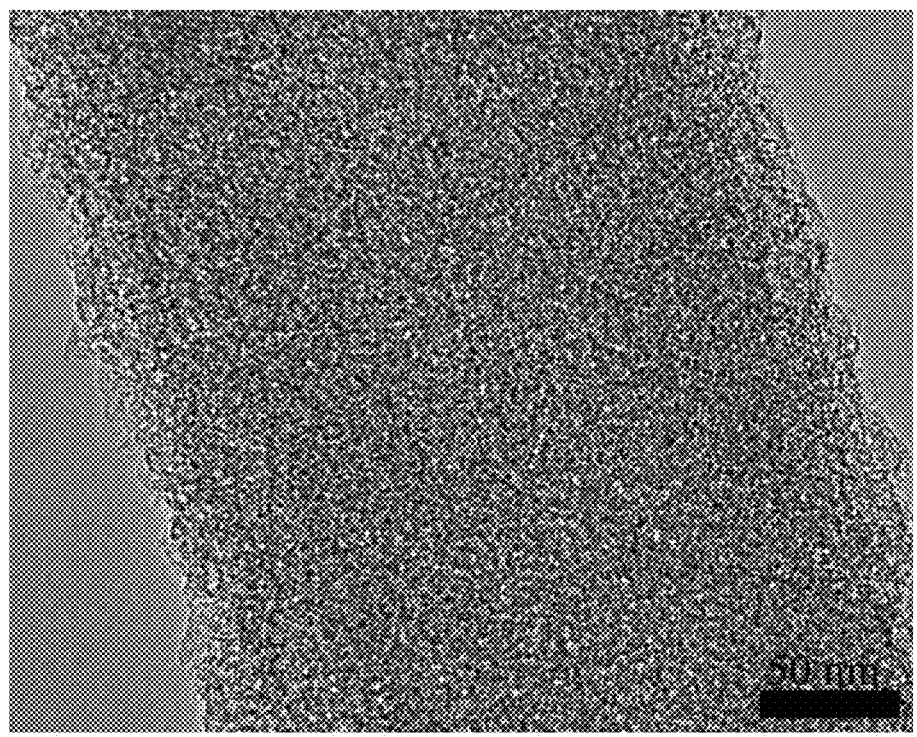
FIG. 5 shows an SEM image (morphology) of the porous graphene nanowires containing oxygen heteroatoms according to one embodiment of the present invention.

(4) The composite is dissolved into hydrochloric acid and then the catalyst is removed to obtain the porous graphene nanowires, which is shown in the morphology of fiber (FIG. 5).

In this example, the obtained porous graphene nanowires have the diameter of about 100 nm, the length of about 100 µm and the specific surface area of up to about 600 $m^2/g$.

EXAMPLE 11

This example provides a method of producing porous graphene nanowires, which includes the following steps:

(1) Magnesium nitrate is dissolved into water, with concentration of magnesium ions of about 1.0 mol/L. Then, the solution is put into a reaction still under about 180° C. for about 2 hours to obtain nanowire catalysts.

(2) The nanowire catalysts are calcined under the temperature of about 500° C., forming porous catalyst nanowires.

(3) Polyaniline is introduced to a reactor containing the porous catalyst nanowires, using the chemical vapor deposition, at the temperature of about 1100° C. for about 0.5 hours, which leads to the growth of graphene in the nanowire porous catalysts to form a composite therewith. The composite includes the grown graphene on the porous catalyst nanowires.

(4) The composite is dissolved into nitric acid and then the catalyst is removed to obtain the porous graphene nanowires.

In this example, the obtained porous graphene nanowires have the diameter of about 500 nm, the length of about 800 µm and the specific surface area of up to about 600 $m^2/g$.

EXAMPLE 12

This example provides a method of producing porous graphene nanowires, which includes the following steps:

(1) Magnesium acetate is dissolved into water, with concentration of magnesium ions of about 2.0 mol/L. Then, the solution is put into a reaction still under about 180° C. for about 5 hours to obtain nanowire catalysts.

(2) The nanowire catalysts are calcined under the temperature of about 500° C., forming porous catalyst nanowires.

(3) Polyimide is introduced to a reactor containing the porous catalyst nanowires, using the chemical vapor deposition, at the temperature of about 950° C. for about 10 min, which leads to the growth of graphene in the nanowire porous catalysts to form a composite therewith. The composite includes the grown graphene on the porous catalyst nanowires.

(4) The composite is dissolved into hydrochloric acid and then the catalyst is removed to obtain the porous graphene nanowires that are doped with nitrogen atoms.

Figure 6:
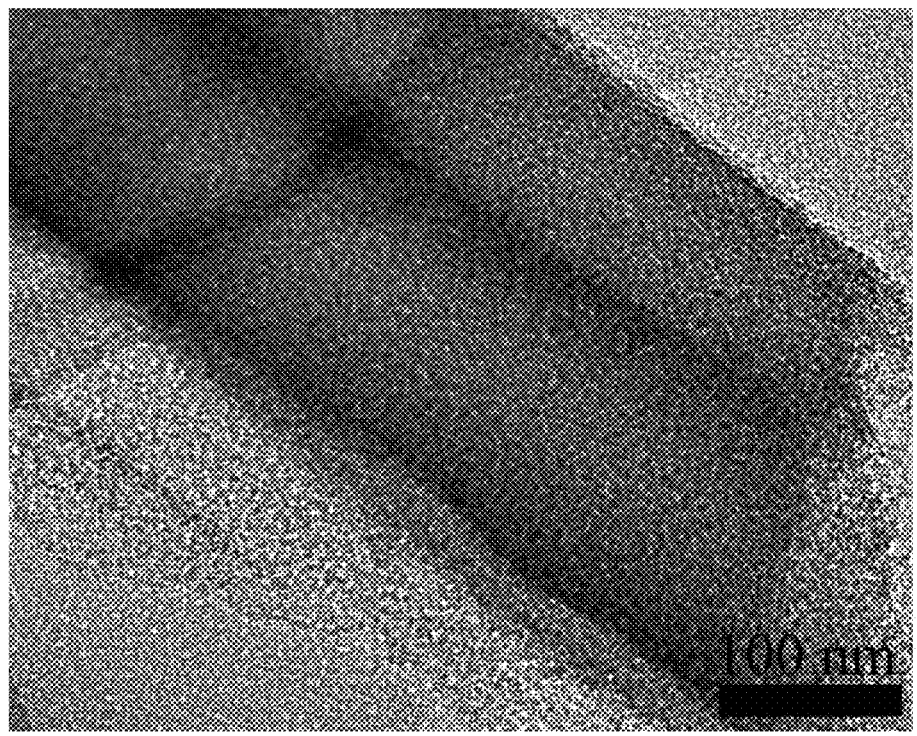
FIG. 6 shows an SEM image (morphology) of the porous graphene nanowires containing nitrogen heteroatoms according to one embodiment of the present invention.

The SEM image of the porous graphene nanowires is shown in FIG. 6. In this example, the obtained porous graphene nanowires have the diameter of about 800 nm, the length of about 1 mm and the specific surface area of up to about 400 $m^2/g$.

EXAMPLE 13

This example provides a method of producing porous graphene nanowires, which includes the following steps:

(1) Magnesium oxide is dissolved into water, with concentration of magnesium ions of about 0.1 mol/L. Then, the solution is put into a reaction still under about 150° C. for about 12 hours to obtain nanowire catalysts.

(2) The nanowire catalysts are calcined under the temperature of about 500° C., forming porous catalyst nanowires.

(3) A liquid carbon source such as polyaniline is introduced to a reactor containing the porous catalyst nanowires, using the thermal deposition, at the temperature of about 1000° C. for about 0.5 hours, which leads to the growth of graphene in the nanowire porous catalysts to form a composite therewith. The composite includes the grown graphene on the porous catalyst nanowires.

(4) The composite is dissolved into sulfuric acid and then the catalyst is removed to obtain the porous graphene nanowires.

In this example, the obtained porous graphene nanowires have the diameter of about 50 nm, the length of about 160 µm and the specific surface area of up to about 300 $m^2/g$.

EXAMPLE 14

This example provides a method of producing porous graphene nanowires, which includes the following steps:

(1) Magnesium sulfate is dissolved into water, with concentration of magnesium ions of about 3.0 mol/L. Then, the solution is put into a reaction still under about 150° C. for 12 hours to obtain nanowire catalysts.

(2) The nanowire catalysts are calcined under the temperature of about 600° C., forming porous catalyst nanowires.

(3) A liquid carbon source such as thiophene is introduced to a reactor containing the porous catalyst nanowires, using the chemical vapor deposition, at the temperature of about 950° C. for about 1 hours, which leads to the growth of graphene in the nanowire porous catalysts to form a composite therewith. The composite includes the grown graphene on the porous catalyst nanowires.

(4) The composite is dissolved into sulfate acid and then the catalyst is removed to obtain the porous graphene nanowires.

In this example, the obtained porous graphene nanowires have the diameter of about 500 nm, the length of about 800 µm, and the specific surface area of up to about 380 $m^2/g$.

EXAMPLE 15

This example provides a method of producing porous graphene nanowires, which includes the following steps:

(1) Magnesium acetate is dissolved into water, with concentration of magnesium ions of about 1.0 mol/L. Then, the solution is put into a reaction still under about 180° C. for about 4 hours to obtain nanowire catalysts.

(2) The nanowire catalysts are calcined under the temperature of about 550° C., forming porous catalyst nanowires.

(3) Methane is introduced to a reactor containing the porous catalyst nanowires, using the chemical vapor deposition, at the temperature of about 900° C. for about 5 min, which leads to the growth of graphene in the nanowire porous catalysts to form a composite therewith. The composite includes the grown graphene on the porous catalyst nanowires.

(4) The composite is dissolved into hydrochloric acid and then the catalyst is removed to obtain the porous graphene nanowires.

Figure 7:
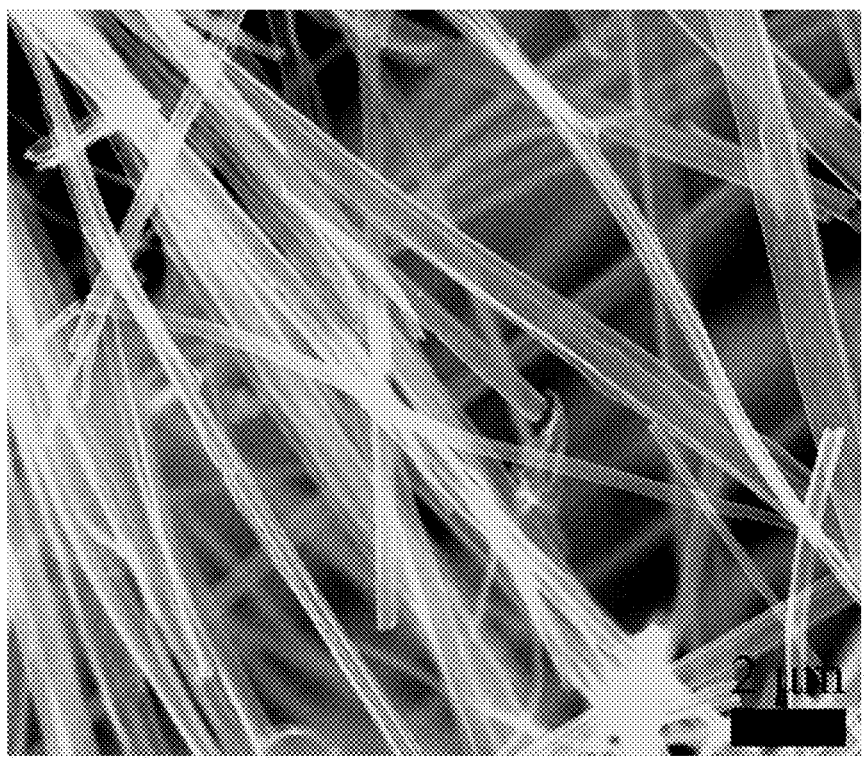
FIG. 7 shows a transmission electron microscopy (TEM) image of the porous graphene nanowires according to one embodiment of the present invention.

As shown in FIG. 7, the SEM image of the porous graphene nanowires shows the pore-rich and nanowire morphology of the porous graphene nanowires. In this example, the obtained porous graphene nanowires have a pore size of about 10 nm, and the specific surface area of up to about 1000 m²/g.

Figure 8:
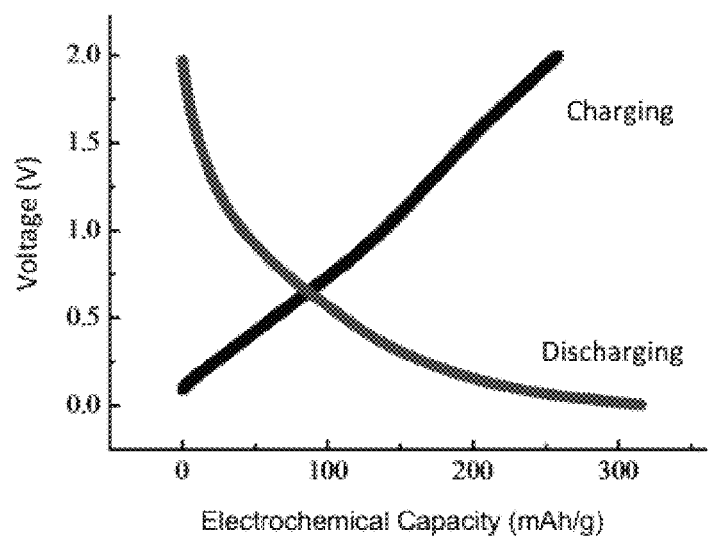
FIG. 8 shows electrochemical performance of a sodium ion battery having the cathode formed of the invented porous graphene nanowires according to one embodiment of the present invention.
Figure 9:
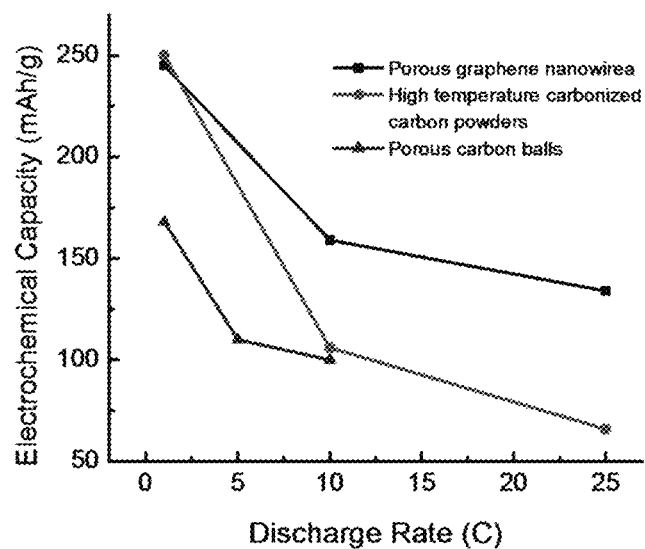
FIG. 9 shows functionalities of the sodium ion battery having the cathode formed of the invented porous graphene nanowires according to one embodiment of the present invention and of a sodium ion battery having the cathode formed of other carbon materials.

In one aspect of the invention, the porous graphene nanowires can be used in an energy storage device. In this exemplary embodiment, the porous graphene nanowires produced in EXAMPLE 15 is employed to fabricate an electrode. First, the porous graphene nanowires are uniformly mixed with polyvinylidene fluoride according to the mass percentages of 80% and 20%, respectively, to form a mixture thereof. Next, the mixture is painted or coated to a copper film to make an electrode. The electrode is then assembled to a sodium ion battery, for example, as a cathode. Charging and discharging of the electrode is performed. As shown in FIG. 8, when the cathode material at a current density of about 0.5 C, the battery has the electrochemical capacity of about 280 mAh/g. FIG. 9 shows a comparison of the functionalities of the sodium ion battery having the cathode formed of the invented porous graphene nanowires and of a sodium ion battery having the cathode formed of other carbon materials, which indicates the rate performance of the cathode formed of the porous graphene nanowires is much better than that of the cathode formed of the other carbon materials.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

Some references, which may include patents, patent applications and various publications, are cited and discussed in the description of this invention. The citation and/or discussion of such references is provided merely to clarify the description of the present invention and is not an admission that any such reference is "prior art" to the invention described herein. All references cited and discussed in this specification are incorporated herein by reference in their entireties and to the same extent as if each reference was individually incorporated by reference.

What is claimed is:

1. A material, comprising nanoporous graphene nanowires, wherein the nanoporous graphene nanowires are formed by:
   dissolving a magnesium compound into water to form a solution having a concentration of magnesium ions in a range of about 0.005-10.0 mol/L, and treating the solution to obtain catalysts;
   calcining the catalysts at a temperature in a range of about 100-800° C. to form porous catalyst nanowires;
   introducing a carbon source to a reactor containing the porous catalyst nanowires at a temperature in a range of about 400-1500° C. to grow graphene on the porous catalyst nanowires, thereby forming a composite thereof; and
   obtaining the porous graphene nanowires from the formed composite.

2. The material according to the claim 1, wherein the porous graphene nanowires have fiber morphology, with lengths in a range of about 0.5 μm to about 2 mm, and diameters in a range of about 10 nm to about 15 μm.

3. The material according to the claim 1, wherein the porous graphene nanowires have a pore-rich structure, with a specific surface area in a range of about 1000-3000 m²/g.

4. The material according to the claim 1, wherein the catalysts have nanowire morphology, with lengths in a range of about 0.5 μm to about 2 mm and diameters in a range of about 10 mm to about 15 μm.

5. The material according to the claim 1, wherein the magnesium compound comprises magnesium oxide, magnesium hydroxide, magnesium chloride, magnesium nitrate, magnesium sulfate, magnesium acetate, magnesium carbonate, or any combination thereof.

6. The material according to the claim 1, wherein the carbon source comprises hydrocarbon, or a heteroatom-containing organic compound.

7. The material according to the claim 6, wherein the hydrocarbon comprises aromatic hydrocarbon, or non-aromatic hydrocarbon.

8. The material according to the claim 7, wherein the aromatic hydrocarbon comprises benzene, toluene, xylene, or any combination thereof.

9. The material according to the claim 7, wherein the non-aromatic hydrocarbon comprises methane, ethane, propane, ethylene, propylene, acetylene, or any combination thereof.

10. The material according to the claim 6, wherein the heteroatom-containing organic compound comprises sucrose, glucose, polyimide, polyaniline, phenolic resin, thiophene, or any combination thereof.

11. The material according to the claim 1, wherein said treating the solution comprises heating the solution at a temperature in a range of about 100-300° C. for a period of time in a range of about 1-20 hours.

12. The material according to the claim 1, wherein said introducing the carbon source is performed with chemical vapor deposition.

13. The material according to the claim 12, wherein a reaction time for the chemical vapor deposition is in a range of about 30 seconds to about 15 hours.

14. The material according to the claim 1, wherein said obtaining the porous graphene nanowires comprises:
   dissolving the formed composite into an acid reagent; and
   removing the porous catalyst nanowires from the dissolved composite to obtain the porous graphene nanowires.

15. The material according to the claim 14, wherein the acid reagent comprises hydrochloric acid, acetic acid, nitric acid, or sulfuric acid.

16. An article, comprising the material of porous graphene nanowires of claim 1.

17. The article of claim 16, wherein the material of porous graphene nanowires is adapted as an electrochemical energy storage material, carriers of catalysts, a conductive material, an adsorption material, or a desorption material.

18. The article of claim 17, being an electrode usable for a battery.

* * * * *